United States Patent
Gouke (10) Patent No.: US 7,462,410 B2
(45) Date of Patent: Dec. 9, 2008

(54) MAGNETIC RECORDING MEDIUM AND MAGNETIC STORAGE APPARATUS

(75) Inventor: Takashi Gouke, Higashine (JP)

(73) Assignee: Fujitsu Limited, Kawasaki (JP)

( * ) Notice: Subject to any disclaimer, the term of this patent is extended or adjusted under 35 U.S.C. 154(b) by 505 days.

(21) Appl. No.: 11/065,512

(22) Filed: Feb. 24, 2005

(65) Prior Publication Data
US 2006/0099460 A1 May 11, 2006

(30) Foreign Application Priority Data
Nov. 9, 2004 (JP) ............................. 2004-325145

(51) Int. Cl.
*G11B 5/66* (2006.01)
(52) U.S. Cl. .................... 428/831.2; 360/131
(58) Field of Classification Search ............... 428/831.2; 360/131
See application file for complete search history.

(56) References Cited

U.S. PATENT DOCUMENTS

| | | | |
|---|---|---|---|
| 6,537,684 B1 * | 3/2003 | Doerner et al. ............. | 428/611 |
| 6,670,055 B2 * | 12/2003 | Tomiyasu et al. ......... | 428/831.1 |
| 6,761,982 B2 | 7/2004 | Sakawaki et al. | |
| 6,808,830 B2 | 10/2004 | Sakawaki et al. | |
| 7,264,892 B2 * | 9/2007 | Ajan et al. ................. | 428/831 |
| 2002/0119350 A1 | 8/2002 | Tomiyasu et al. | |
| 2003/0108774 A1 | 6/2003 | Kawai et al. | |
| 2003/0124389 A1 | 7/2003 | Yoshida et al. | |
| 2004/0072022 A1 | 4/2004 | Kanbe et al. | |
| 2004/0219394 A1 | 11/2004 | Kawai et al. | |
| 2005/0191524 A1 * | 9/2005 | Murao et al. ............... | 428/827 |
| 2005/0276998 A1 * | 12/2005 | Sato ............................ | 428/831 |

FOREIGN PATENT DOCUMENTS

| EP | 1 059 629 A2 | 12/2000 |
|---|---|---|
| JP | 0 704 839 | 4/1996 |
| JP | 2002-260210 | 9/2002 |
| JP | 2003-173515 | 6/2003 |

OTHER PUBLICATIONS

Bertram et al.; "Arrhenius-Neel Thermal Decay in Polycrystalline Thin Film Media"; Journal of Applied Physics, Vo. 85, No. 8, pp. 4991-4993; Apr. 15, 1999.

* cited by examiner

*Primary Examiner*—Holly Rickman
(74) *Attorney, Agent, or Firm*—Greer, Burns & Crain, Ltd.

(57) ABSTRACT

A magnetic recording medium includes a substrate, an AlFe-based alloy layer provided above the substrate, an underlayer provided on the AlFe-based alloy layer, and a recording layer provided on the underlayer and magnetized in a predetermined recording direction when being recorded with information. The substrate has a textured surface having grooves formed approximately along the recording direction.

21 Claims, 8 Drawing Sheets

| | AlFe-BASED ALLOY LAYER | COERCIVITY kA/m | COERCIVITY SQUARENESS RATIO | KuV/kT | Ku MJ/m³ |
|---|---|---|---|---|---|
| Emb1-1 | $Al_{70}Fe_{30}$ | 434.5 | 0.82 | 90 | 3.59 |
| Emb1-2 | $Al_{60}Fe_{40}$ | 421.5 | 0.74 | 84 | 3.54 |
| Emb1-3 | $Al_{50}Fe_{50}$ | 348.4 | 0.50 | 77 | 3.24 |
| Emb1-4 | $Al_{40}Fe_{60}$ | 316.6 | 0.27 | 60 | 2.91 |
| Cmp | — | 337.3 | 0.58 | 64 | 3.20 |

| | AlFe-BASED ALLOY LAYER | COERCIVITY kA/m | COERCIVITY SQUARENESS RATIO | KuV/kT | Ku MJ/m$^3$ |
|---|---|---|---|---|---|
| Emb1-1 | Al$_{70}$Fe$_{30}$ | 434.5 | 0.82 | 90 | 3.59 |
| Emb1-2 | Al$_{60}$Fe$_{40}$ | 421.5 | 0.74 | 84 | 3.54 |
| Emb1-3 | Al$_{50}$Fe$_{50}$ | 348.4 | 0.50 | 77 | 3.24 |
| Emb1-4 | Al$_{40}$Fe$_{60}$ | 316.6 | 0.27 | 60 | 2.91 |
| Cmp | — | 337.3 | 0.58 | 64 | 3.20 |

FIG.7

| | AlFe-BASED ALLOY LAYER | COERCIVITY kA/m | COERCIVITY SQUARENESS RATIO |
|---|---|---|---|
| Emb2-1 | $Al_{70}Fe_{30}$ | 375.3 | 0.66 |
| Emb2-2 | $Al_{60}Fe_{40}$ | 369.5 | 0.74 |
| Emb2-3 | $Al_{50}Fe_{50}$ | 390.7 | 0.71 |
| Emb2-4 | $Al_{40}Fe_{60}$ | 380.2 | 0.65 |
| Cmp | — | 337.3 | 0.58 |

FIG.8

MAGNETIC RECORDING MEDIUM AND MAGNETIC STORAGE APPARATUS

BACKGROUND OF THE INVENTION

This application claims the benefit of a Japanese Patent Application No. 2004-325145 filed Nov. 9, 2004, in the Japanese Patent Office, the disclosure of which is hereby incorporated by reference.

1. Field of the Invention

The present invention generally relates to magnetic recording media and magnetic storage apparatuses, and more particularly to a magnetic recording medium employing the in-plane or longitudinal magnetic recording technique and to a magnetic storage apparatus which uses such a magnetic recording medium.

2. Description of the Related Art

Magnetic storage apparatuses, such as magnetic disk drives, are popularly used to store digital image data related to dynamic images, audio data related to music and the like. The magnetic storage apparatus is particularly used increasingly as a video recorder for home use, to replace the video tape recorder for home use, due to the improved performance of the magnetic storage apparatus, such as the capability to perform a high-speed access, the compact size of the apparatus and the large storage capacity of the apparatus. Hence, the market for the magnetic storage apparatus is rapidly increasing. The amount of information (or information quantity) included in the dynamic image data (or video data) is extremely large, and the magnetic disk drive needs to have a large capacity in order to store the dynamic image data. For this reason, the recording density of the magnetic recording media have increased at a rate of almost 100% per year, and it is essential to develop techniques for the magnetic recording medium and the magnetic head that would enable further increase in the recording density of the magnetic recording medium.

In order to realize a high recording density on the magnetic recording medium, that is, in order to record information in a recording layer of the magnetic recording medium with a high density, it is necessary to reduce the area of a minimum recording unit that is magnetically formed on the recording layer in correspondence with one bit of information. The isolated reproduced waveform half-width, namely W50, is used as an index for indicating the reduction of the area of the minimum recording unit. The W50 is the half-width of one peak (reproduced waveform) that is obtained by making a recording on the recording layer of the magnetic recording medium by reversing a recording magnetic field only once and then reproducing the same. In general, the recording and reproducing resolution becomes higher as the W50 becomes larger, and the magnetic recording medium having a small W50 is suited for realizing the high recording density.

The W50 is described by $2\{(g/2)^2+(d+e)^2\}^{1/2}$, where g denotes a gap length of a reproducing element of the magnetic head, d denotes a magnetic spacing between the recording layer and the reproducing element of the magnetic head, and e denotes a magnetic transition width of the recording layer. It may be seen that one method of reducing the W50 is to reduce the magnetic transition width e of the recording layer. A magnetic transition region is formed between a region that is magnetized in one direction by the recording and a following region (magnetization region) that is magnetized in the reverse direction with respect to the one direction. In other words, the magnetic transition region is necessary to reverse the magnetization direction. The magnetic transition width e is the length of the magnetic transition region along the recording direction.

Normally, a ferromagnetic CoCr alloy is used for the recording layer of the magnetic recording medium. Hence, the recording layer is a polycrystal made up of a large number of crystal grains of the CoCr alloy. In the magnetic transition region, it is known that the magnetic transition width e decreases as the individual crystal grains become smaller, and studies have been made to reduce the individual crystal grains in order to decrease the magnetic transition width e.

However, when the size of the crystal grains of the recording layer is excessively reduced, a phenomenon in which the magnetization of the magnetization layer decreases with the lapse of time becomes conspicuous. This phenomenon occurs due to the following. That is, the barrier height of the energy barrier for reversing the magnetization of the individual crystal grains forming the magnetization region decreases as the crystal grains become smaller. In addition, a sum of the temperature (thermal energy) and the energy of the reverse magnetization field generated in the reverse direction to the magnetization becomes larger than the barrier height, to thereby reverse the magnetization of the crystal grains. Hence, this phenomenon is caused by the deterioration of the thermal stability.

KuV/kT is used as an index for indicating the thermal stability, where Ku denotes an uniaxial anisotropy constant indicating the magnitude of the anisotropic energy of the recording layer in the direction of the axis of easy magnetization, V denotes a volume of the crystal grains of the recording layer, k denotes a Boltzmann's constant, and T denotes the temperature of the magnetic recording medium. Hence, KuV/kT is represented by a ratio of the energy KuV that indicates the extent to which the magnetization direction is fixed and the thermal energy kT that causes instability of the magnetization direction. The thermal stability is better when the value of KuV/kT is larger.

Conventionally, studies have been made on the composition of the recording layer for the purposes of increasing the value of KuV/kT. For example, Pt was added to the CoCr alloy or the CoCrTa alloy forming the recording layer, so as to increase the uniaxial anisotropy constant Ku and consequently increase the value of KuV/kT.

On the other hand, studies have also been made on the so-called mechanical texturing which mechanically forms a large number of grooves in the recording direction on the substrate surface or the like. Due to the internal stress that is induced by the undulations of the mechanical texturing, the axes of easy magnetization of the individual crystal grains of the recording layer become oriented in the recording direction. As a result, it is possible to increase the uniaxial anisotropy constant Ku and consequently increase the value of KuV/kT.

The applicant is aware of a Japanese Laid-Open Patent Application No. 2002-260210 which proposes a magnetic recording medium taking measures to improve the thermal stability.

However, if the Pt content of the recording layer is excessively increased, the crystallinity of the parent phase of CoCr deteriorates, and as a result, the thermal stability deteriorates and the medium noise increases. In addition, the anisotropic field which indicates the magnitude of the recording field necessary to rotate the magnetization increases, to thereby deteriorate the recording characteristics such as the overwrite performance.

On the other hand, there is a limit to improving the coercivity in the recording direction solely by the mechanical texturing. In other words, if the depth of the grooves of the mechanical texturing is increased to increase the coercivity, the undulations of the mechanical texturing increases. Since the undulations are inherited to the surface of the magnetic recording medium, the increased undulations would increase the surface roughness of the magnetic recording medium. In such a magnetic recording medium having the increased surface roughness, it becomes difficult to reduce a distance (floating distance) between the magnetic head and the surface of the magnetic recording medium. As a result, it becomes difficult to reduce the W50 which depends on the magnetic spacing d between the recording layer and the reproducing element of the magnetic head.

SUMMARY OF THE INVENTION

Accordingly, it is a general object of the present invention to provide a novel and useful magnetic recording medium and magnetic storage apparatus, in which the problems described above are suppressed.

Another and more specific object of the present invention is to provide a magnetic recording medium and a magnetic storage apparatus, which can improve both the coercivity in the recording direction and the thermal stability, so that it is possible to realize a high recording density.

Still another object of the present invention is to provide a magnetic recording medium comprising a substrate; an AlFe-based alloy layer provided above the substrate; an underlayer provided on the AlFe-based alloy layer; and a recording layer, provided on the underlayer, and magnetized in a predetermined recording direction when being recorded with information, wherein the substrate has a textured surface having grooves formed approximately along the recording direction. According to the magnetic recording medium of the present invention, it is possible to improve both the coercivity in the recording direction and the thermal stability, so that it is possible to realize a high recording density.

A further object of the present invention is to provide a magnetic recording medium comprising a substrate; a texturing layer provided on the substrate; an AlFe-based alloy layer provided above the texturing layer; an underlayer provided on the AlFe-based alloy layer; and a recording layer, provided on the underlayer, and magnetized in a predetermined recording direction when being recorded with information, wherein the texturing layer has a textured surface having grooves formed approximately along the recording direction. According to the magnetic recording medium of the present invention, it is possible to improve both the coercivity in the recording direction and the thermal stability, so that it is possible to realize a high recording density.

Another object of the present invention is to provide a magnetic storage apparatus comprising at least one magnetic recording medium; and a head configured to record information on and reproduce information from the magnetic recording medium, wherein the magnetic recording medium comprises a substrate, an AlFe-based alloy layer provided above the substrate, an underlayer provided on the AlFe-based alloy layer, and a recording layer provided on the underlayer and magnetized in a predetermined recording direction when being recorded with information, and the substrate has a textured surface having grooves formed approximately along the recording direction. According to the magnetic storage apparatus of the present invention, it is possible to improve both the coercivity in the recording direction and the thermal stability, so that it is possible to realize a high recording density.

Still another object of the present invention is to provide a magnetic storage apparatus comprising at least one magnetic recording medium; and a head configured to record information on and reproduce information from the magnetic recording medium, wherein the magnetic recording medium comprises a substrate, a texturing layer provided on the substrate, an AlFe-based alloy layer provided above the texturing layer, an underlayer provided on the AlFe-based alloy layer, and a recording layer provided on the underlayer and magnetized in a predetermined recording direction when being recorded with information, and the texturing layer has a textured surface having grooves formed approximately along the recording direction. According to the magnetic storage apparatus of the present invention, it is possible to improve both the coercivity in the recording direction and the thermal stability, so that it is possible to realize a high recording density.

Other objects and further features of the present invention will be apparent from the following detailed description when read in conjunction with the accompanying drawings.

DESCRIPTION OF THE PREFERRED EMBODIMENTS

The present inventor studied nonmagnetic layers made of various materials in order to achieve the object of the present invention described above. The present inventor found that when an AlFe layer is formed on a textured substrate surface, magnetic characteristics of a recording layer greatly improve compared to the case where no AlFe layer is formed. The effects of providing the AlFe layer were seen in the increases of KuV/kT and the uniaxial anisotropy constant Ku which are used as the indexes for indicating the thermal stability and the coercivity in the recording direction. The present inventor also found that it is possible to considerably increase the above described effects by setting the stoichiometric composition of the AlFe layer to a composition in which the Fe concentration is reduced from the composition $Al_{50}Fe_{50}$.

The above described effects of the AlFe layer were confirmed experimentally, but it may be regarded that the effects are obtained due to the following.

Figure 1:
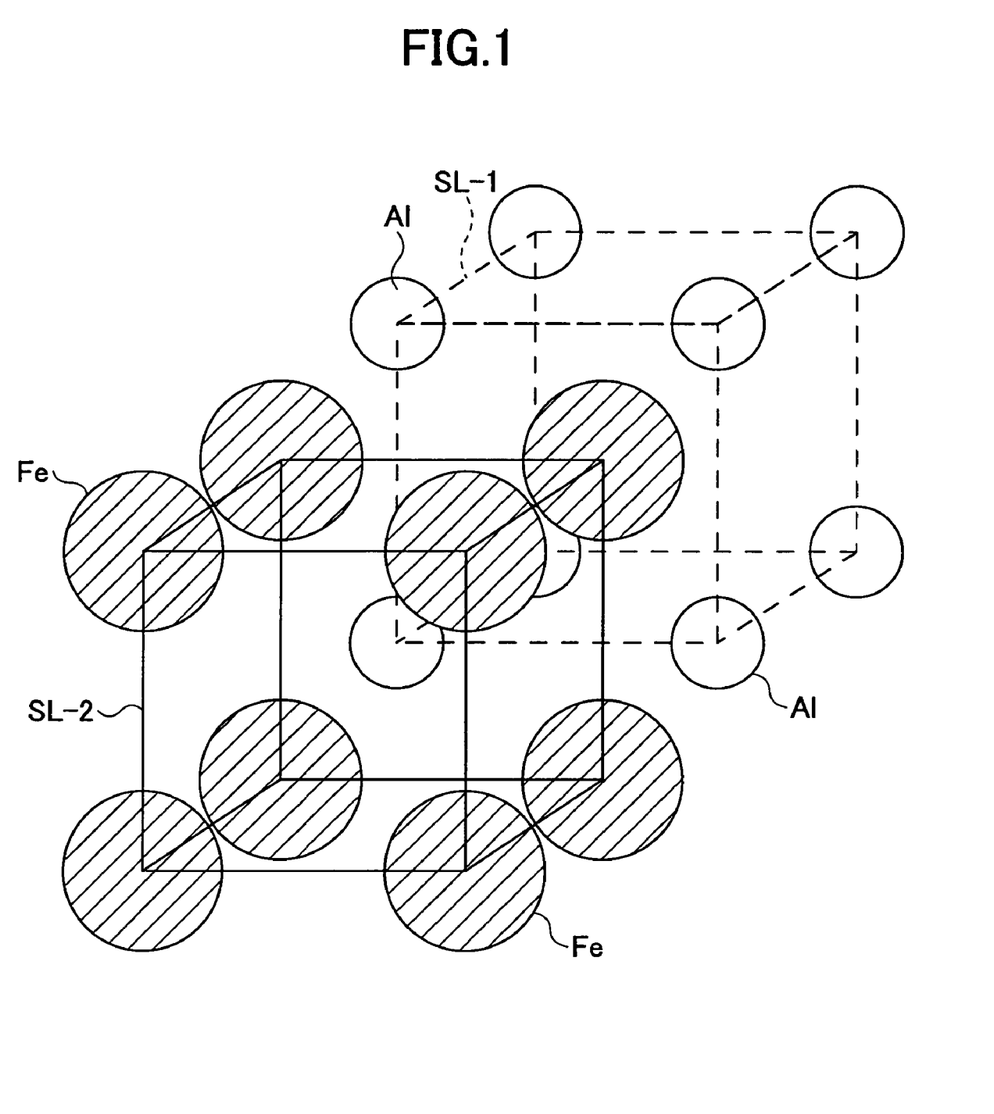
FIG. 1 is a diagram showing a crystal structure of AlFe.

The FeAl layer has a B2 crystal structure. The B2 crystal structure is a CsCl (cesium chloride) type metal ordered phase that is based on a body-centered cubic (bcc) crystal structure. FIG. 1 is a diagram showing the crystal structure of AlFe. As shown in FIG. 1, in the case of the B2 structure of the AlFe layer, sublattices SL-1 and SL-2 of the Al and Fe form a simple cubic lattice. In FIG. 1, the Al atom is indicated without the hatchings, and the Fe atom is indicated with the hatchings. One Fe atom is arranged at a center of the sublattice SL-1 of the cubic lattice formed by four Al atoms. On the other hand, one Al atom is arranged at a center of the sublattice SL-2 of the cubic lattice formed by four Fe atoms. Accordingly, the AlFe layer has a composition ratio Al:Fe=1:1, which may be described by $Al_{50}Fe_{50}$ in atomic concentration.

The Al atom has an atomic radius smaller than that of the Fe atom. For this reason, when the Fe atom of the Fe sublattice SL-2 is replaced by the Al atom, a gap is generated between the replacing Al atom of the Fe sublattice SL-2 and the original Al atom of the Al sublattice SL-1. Since the atomic positions of the replacing Al atom of the Fe sublattice SL-1 and the original Al atom of the Al subllattice SL-1 shift so as to fill the gap, the Fe sublattice SL-1 and the Al sublattice SL-2 become distorted. In other words, as the Fe concentration of the AlFe layer is reduced, the distortion in the Fe sublattice SL-1 and the Al sublattice SL-2 of the AlFe layer increases.

When the AlFe layer described above is formed on the textured surface having undulations, the Fe sublattice SL-1 and the Al sublattice SL-2 of the AlFe layer become distorted due to the effects of the internal stress induced by the undulations, to thereby further increase the internal stress. Hence, the increased internal stress of the AlFe layer is inherited to the recording layer that is provided above the AlFe layer, so as to promote the orientation of the axes of easy magnetization of the magnetic grains forming the recording layer in the recording direction. As a result, it may be regarded that the coercivity of the recording layer in the recording direction and the value of KuV/kT that is, the thermal stability, are greatly increased.

In general, the textured surface includes a large number of grooves forming along the recording direction of the magnetic recording medium. In the case of a magnetic tape, the texturing is formed in the longitudinal direction of the magnetic tape if the recording direction is along the longitudinal direction. In the case of a magnetic disk, the texturing is formed in the circumferential direction of the magnetic disk if the recording direction is along the circumferential direction. By applying the present invention to the magnetic recording media such as the magnetic tape and the magnetic disk, it is possible to improve both the coercivity in the recording direction of the recording layer and the thermal stability, so that it is possible to realize a high recording density.

Next, a description will be given of embodiments of a magnetic recording medium according to the present invention and a magnetic storage apparatus of the present invention, by referring to FIGS. 2 through 8.

Figure 2:
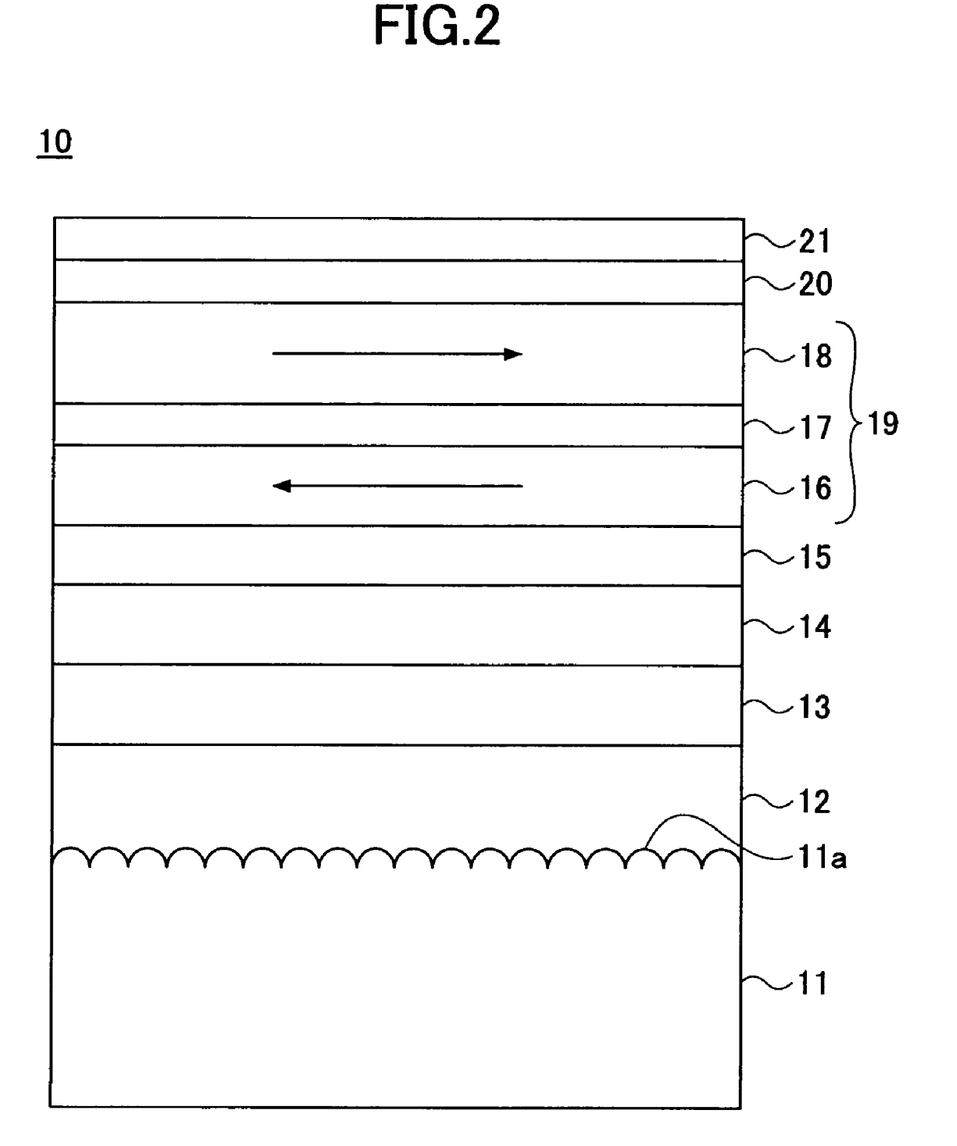
FIG. 2 is a cross sectional view showing a first embodiment of a magnetic recording medium according to the present invention.

FIG. 2 is a cross sectional view showing a first embodiment of the magnetic recording medium according to the present invention.

A magnetic recording medium 10 shown in FIG. 2 has a substrate 11 with a textured surface 11a. A seed layer 12, an AlFe-based alloy layer 13, an underlayer 14, a nonmagnetic intermediate layer 15, a first magnetic layer 16, a nonmagnetic coupling layer 17, a second magnetic layer 18, a protection layer 20, and a lubricant layer 21 are successively stacked on the textured surface 11a of the substrate 11.

The AlFe-based alloy layer 13 is based mainly on AlFe but may contain very small amounts of other elements or impurities. If the AlFe-based alloy used for the AlFe-based alloy layer 13 maintains a B2 crystal structure in the thin film state, it is possible to obtain the effects of this embodiment described later. If the AlFe-based alloy layer 13 is made of AlFe, for example, the AlFe thin film maintains the B2 crystal structure when the Al content is 23.3 at. % to 55 at. %.

The first magnetic layer 16, the nonmagnetic coupling layer 17 and the second magnetic layer 18 form a recording layer 19. This recording layer 19 has an exchange-coupled structure in which the first magnetic layer 16 and the second magnetic layer 18 are antiferromagnetically exchange-coupled via the nonmagnetic coupling layer 17. In a state where no external magnetic field is applied on the magnetic recording medium 10, in-plane magnetizations of the first and second magnetic layers 16 and 18 are mutually antiparallel. Unless otherwise indicated, the first and second magnetic layers 16 and 18 will simply be referred to as the recording layer 19 for the sake of convenience.

In FIG. 2, undulations are formed on the surfaces of each of the layers from the seed layer 12 up to the protection layer 20 that are provided on the textured surface 11a, due to the effects of the undulations of the textured surface 11a. However, for the sake of convenience, the illustration of the undulations is omitted in FIG. 2 for each of the layers provided on the textured surface 11a.

In this embodiment, it is assumed for the sake of convenience that the present invention is applied to a magnetic disk. Hence, the substrate 11 of the magnetic recording medium (magnetic disk) 10 has a disk shape. The textured surface 11a is textured in the recording direction, that is, in the circumferential direction of the magnetic recording medium 10. The AlFe-based alloy layer 13 is formed on the textured surface 11a via the seed layer 12. In the magnetic recording medium 10, the orientation of the axes of easy magnetization of the crystal grains forming the recording layer 19, that is, the first and second magnetic layers 16 and 18, is promoted in the circumferential direction due to the mechanisms described above. For this reason, a coercivity Hcc of the recording layer 19 in the circumferential direction increases, and the thermal stability of the magnetic recording medium 10 improves. As a result, a high recording density can be realized on the magnetic recording medium 10.

Next, a more detailed description will be given of the magnetic recording medium 10.

The substrate 11 may be made of any suitable material, and is not limited to a particular material. For example, a glass substrate, a NiP-plated Al alloy substrate, a Si (silicon) substrate, a plastic substrate, a ceramic substrate and a carbon substrate may be used for the substrate 11.

The textured surface 11a may be provided with any kind of texturing that will improve the orientation of the axes of easy magnetization of the recording layer 19 in the circumferential direction. For example, a mechanical texturing made up of a large number of grooves may be formed along the circumferential direction on the surface of the substrate 11 to form the textured surface 11a. The mechanical texturing may be formed by supplying a slurry including an abrasive to a pad, and moving the substrate 11 and/or the pad which holds the slurry while the pad contacts the substrate surface. The resulting mechanical texturing is made up of a large number of approximately parallel abrasive marks formed on the substrate surface along a predetermined direction which is the circumferential direction in the case of the magnetic disk.

The seed layer 12 may be made of a nonmagnetic and amorphous material such as CoW, CrTi and NiP. The seed layer 12 may also be made of an alloy including three or more elements but primarily made up of CoW, CrTi, NiP or an alloy thereof. Since the surface of the seed layer 12 is amorphous and crystally uniform, the AlFe-based alloy layer 13 is unaffected by the crystal anisotropy when the AlFe-based alloy layer 13 is formed on the seed layer 12. As a result, it becomes easier for the AlFe-based alloy layer 13 itself to form a crystal structure. For this reason, the increase in the coercivity of the recording layer 19 in the circumferential direction and the improvement of the thermal stability are further promoted by the mechanisms described above. The seed layer 12 has a thickness in a range of 5 nm to 30 nm, and preferably in a range of 5 nm to 15 nm. It is not essential to provide the seed layer 12 in the magnetic recording medium 10.

The AlFe-based alloy layer 13 forms an important part of this embodiment. For example, the AlFe-based alloy layer 13 may be made of a nonmagnetic AlFe. In a case where the AlFe-based alloy layer 13 is made of AlFe, it is preferable that the atomic concentration of Fe is set in a range of 30 atomic percent (hereinafter simply referred to as at. %) to 60 at. %. By setting the composition of the AlFe-based alloy layer 13 to such a range, it is possible to improve the magnetic characteristics such as the coercivity of the recording layer 19 in the circumferential direction, the value of KuV/kT and the uniaxial anisotropy constant Ku, as will be described later in conjunction with embodiment samples. Moreover, in the case where the AlFe-based alloy layer 13 is made of AlFe, it is further preferable that the atomic concentration of Fe is set in a range of 30 at. % to 50 at. %. By setting the composition of the AlFe-based alloy layer 13 to such a range that is further preferable, it is possible to further improve the magnetic characteristics.

The AlFe-based alloy layer 13 preferably has a thickness in a range of 2 nm to 100 nm. The effects of providing the AlFe-based alloy layer 13 become insufficient if the thickness of the AlFe-based alloy layer 13 is less than 2 nm, and the crystal grains of the recording layer 19 become excessively large if the thickness of the AlFe-based alloy layer 13 exceeds 100 nm to thereby increase the W50 described above.

The underlayer 14 may be made of Cr or a Cr—X2 alloy having a bcc crystal structure, where X2=Mo, W, V, B, Mo or an alloy thereof. The underlayer 14 preferably has a thickness in a range of 2 nm to 10 nm. In a case where the underlayer 14 is made of the Cr—X2 alloy and the nonmagnetic intermediate layer 15 is provided thereon, it is possible to improve the crystal matching of the nonmagnetic intermediate 15, and accordingly improve the crystallinities of the first and second magnetic layers 16 and 18. In addition, in a case where the underlayer 14 is made of the Cr—X2 alloy and the nonmagnetic intermediate layer 15 is not provided thereon, it is possible to improve the crystal matching of the first magnetic layer 16 which makes direct contact with the underlayer 14, to thereby improve the crystallinities of the first and second magnetic layers 16 and 18.

The underlayer 14 may have a multi-layer structure that is made up of a plurality of stacked layers made of the Cr or Cr—X2 alloy. By employing the multi-layer structure for the underlayer 14, it is possible to suppress the enlargement of the crystal grains of the underlayer 14 itself, and also suppress the enlargement of the crystal grains of the first and second magnetic layers 16 and 18.

The nonmagnetic intermediate layer 15 may be made of a nonmagnetic Co—X3 alloy having a hexagonal close packed (hcp) structure, where X3=Cr, Ta, Mo, Mn, Re, Ru or an alloy thereof. The nonmagnetic intermediate layer 15 has a thickness in a range of 0.5 nm to 5.0 nm, and preferably in a range of 0.5 nm to 3.0 nm. The nonmagnetic intermediate layer 15 is grown epitaxially on the surface of the underlayer 14, and inherits the crystallinity and the grain size distribution of the crystal grains of the underlayer 14. The nonmagnetic intermediate layer 15 has good effects on the crystallinities and the gain size distributions of the first and second magnetic layers 16 and 18 that are grown epitaxially on the nonmagnetic intermediate layer 15. The nonmagnetic intermediate layer 15 may have a multi-layer structure that is made up of a plurality of stacked layers made of Co or the Co—X3 alloy. It is not essential to provide the nonmagnetic intermediate layer 15 in the magnetic recording medium 10.

The first magnetic layer 16 is made of a ferromagnetic material such as Co, Ni, Fe, Co alloys, Ni alloys and Fe alloys. The first magnetic layer 16 has a thickness preferably in a range of 0.5 nm to 20 nm. Particularly CoCr, CoCr alloys, CoCrTa, CoCrTa alloys, CoCrPt and CoCrPt alloys are suited for use as the Co alloy forming the first magnetic layer 16. From the point of view of controlling the crystal grain size (or grain diameter) of the first magnetic layer 16 itself, it is further preferable that the first magnetic layer 16 is made of a CoCr-M1 alloy, where M1=Pt, B, Ta, Ni, Cu, Ag, Pd, Si, C, Fe, Re, Nb, Hf or an alloy thereof. From the point of view of improving the crystal orientation of the second magnetic layer 18, it is preferable that the first magnetic layer 16 has a multi-layer structure that is made up of a plurality of stacked layers made of the ferromagnetic material described above.

For example, the nonmagnetic coupling layer 17 may be made of Ru, Rh, Ir, Ru alloys, Rh alloys and Ir alloys. Rh and Ir have a face centered cubic (fcc) structure, while Ru has the hcp structure. The nonmagnetic coupling layer 17 is preferably made of the Ru or Ru alloy when the second magnetic layer 18 formed thereon has the hcp structure. Particularly in a case where the second magnetic layer 18 is made of a CoCrPt alloy having the hcp structure, the nonmagnetic coupling layer 17 is preferably made of the Ru or Ru alloy since Ru has a lattice constant a=0.27 nm which is close to a lattice constant a=0.25 nm of the CoCrPt alloy. The Ru alloy used for the nonmagnetic coupling layer 17 may include at least one of Co, Cr, Fe, Ni, Mn or an alloy thereof.

The nonmagnetic coupling layer 17 preferably has a thickness set in a range of 0.4 nm to 1.2 nm. By setting the thickness of the nonmagnetic coupling layer 17 such a range, it is possible to antiferromagnetically exchange-couple the first and second magnetic layers 16 and 18 via the nonmagnetic coupling layer 17, so that in a state where no external magnetic field is applied on the magnetic recording medium 10, the magnetizations of the first and second magnetic layers 16 and 18 are mutually antiparallel as indicated by arrows in FIG. 2.

The second magnetic layer 18 may be made of Co, Ni, Fe, Co alloys, Ni alloys, Fe alloys and the like, and preferably has a thickness in a range of 5 nm to 20 nm. Preferably, the second magnetic layer 18 is made of CoCr, CoCr alloys, CoCrTa, CoCrTa alloys, CoCrPt or CoCrPt alloys. From the point of vide of controlling the crystal grain size of the second magnetic layer 18 itself, it is further preferable that the second magnetic layer 18 is made of the CoCr-M1 alloy, similarly as in the case of the first magnetic layer 16. Furthermore, from the point of view of anisotropic field, the second magnetic layer 18 is preferably made of a CoCrPt-M2 alloy, where M2=B, Ta, Ni, Cu, Ag, Pd, Si, C, Fe, Re, Nb, Hf or an alloy thereof.

It is preferable that a product of a remanent magnetization Mr1 and a thickness t1 of the first magnetic layer 16 (that is, a remanent magnetization and thickness product $Mr1 \times t1$) and a product of a remanent magnetization Mr2 and a thickness t2 of the second magnetic layer 18 (that is, a remanent magnetization and thickness product $Mr2 \times t2$) satisfy a relationship $(Mr1 \times t1) < (Mr2 \times t2)$. By setting the remanent magnetization and thickness products of the first and second magnetic layers 16 and 18 to satisfy such a relationship, the recording layer 19 substantially has a remanent magnetization and thickness product amounting to {(Mr2×t2)−(Mr1×t1)}, with the residual magnetization in the same direction as the residual magnetization of the second magnetic layer 18. The substantial remanent magnetization and thickness product amounting to {(Mr2×t2)−(Mr1×t1)} is preferably set in a range of 2.0 nTm to 10.0 nTm.

The first magnetic layer 16 and the second magnetic layer 18 may have different compositions, that is, made of the same material with mutually different compositions or made of mutually different materials. For example, the material used for the second magnetic layer 18 may be selected from materials which result in a larger anisotropic magnetic field than the material used for the first magnetic layer 16. The alloy used for the second magnetic layer 18 may be added with Pt while no Pt is added for the alloy used for the first magnetic layer 16 or, the Pt content (in at. %) of the alloy may be larger for the second magnetic layer 18 than the first magnetic layer 16.

Therefore, in the recording layer 19, the first and second magnetic layers 16 and 18 are antiferromagnetically exchange-coupled via the nonmagnetic coupling layer 17. Hence, the apparent volume of the recording layer 19 becomes substantially equal to a sum of the volumes of the exchange-coupled first and second magnetic layers 16 and 18, which is large compared to the case where the recording layer is formed by a single-layer structure, to thereby increase the value of V in KuV/kT and improve the thermal stability of the magnetizations (or written bits).

The recording layer 19 may be formed by a stacked structure having more than 2 magnetic layers. In this case, the magnetic layers of the stacked structure are exchange-coupled, and at least two magnetic layers are antiferromagnetically exchange-coupled.

As a modification of this first embodiment, the recording layer 19 may be formed by a single magnetic layer, such as the second magnetic layer 18, which does not employ the exchange coupling, similarly as in the case of the conventional magnetic recording media.

The protection layer 20 has a thickness in a range of 0.5 nm to 10 nm, and preferably in a range of 0.5 nm to 5 nm, and is made of Diamond-Like Carbon (DLC), carbon nitride, amorphous carbon and the like, for example.

The lubricant layer 21 is made of an organic liquid lubricant having perfluoropolyether as a main chain and —OH, phenyl, benzene ring or the like as the terminal functional group. The lubricant forming the lubricant layer 21 may be appropriately selected depending on the material used for the protection layer 20. Depending on the kind of protection layer 20 used, the lubricant layer 21 may be omitted.

The layers 12 through 18 and 20 of the magnetic recording medium 10 formed on the substrate 11 (textured surface 11a) may be formed by a vacuum process or a wet process, except for the lubricant layer 21. The vacuum process may be selected from sputtering, vacuum deposition, Chemical Vapor Deposition (CVD) and the like. On the other hand, the wet process may be selected from electroplating, electroless plating and the like. The lubricant layer 21 may be formed by a dipping method such as putting and liquid submersion, spin-coating, and the like.

According to the magnetic recording medium 10 of this first embodiment, the textured surface 11a is formed on the substrate 11, and the AlFe-based alloy layer 13 is formed above the textured surface 11a. Hence, the orientation of the axes of easy magnetization of the recording layer 19 in the circumferential direction that is induced by the textured surface 11a is promoted by the AlFe-based alloy layer 13, to greatly increase the coercivity of the recording layer 19 in the circumferential direction and to greatly improve the thermal stability. Therefore, a high recording density can be achieved on the magnetic recording medium 10. Furthermore, since the amorphous seed layer 12 is formed as a base for the AlFe-based alloy layer 13, it is possible to more easily form the crystal structure of the AlFe-based alloy layer 13 itself, to make the above described effects obtainable by the magnetic recording medium 10 more conspicuous.

Figure 3:
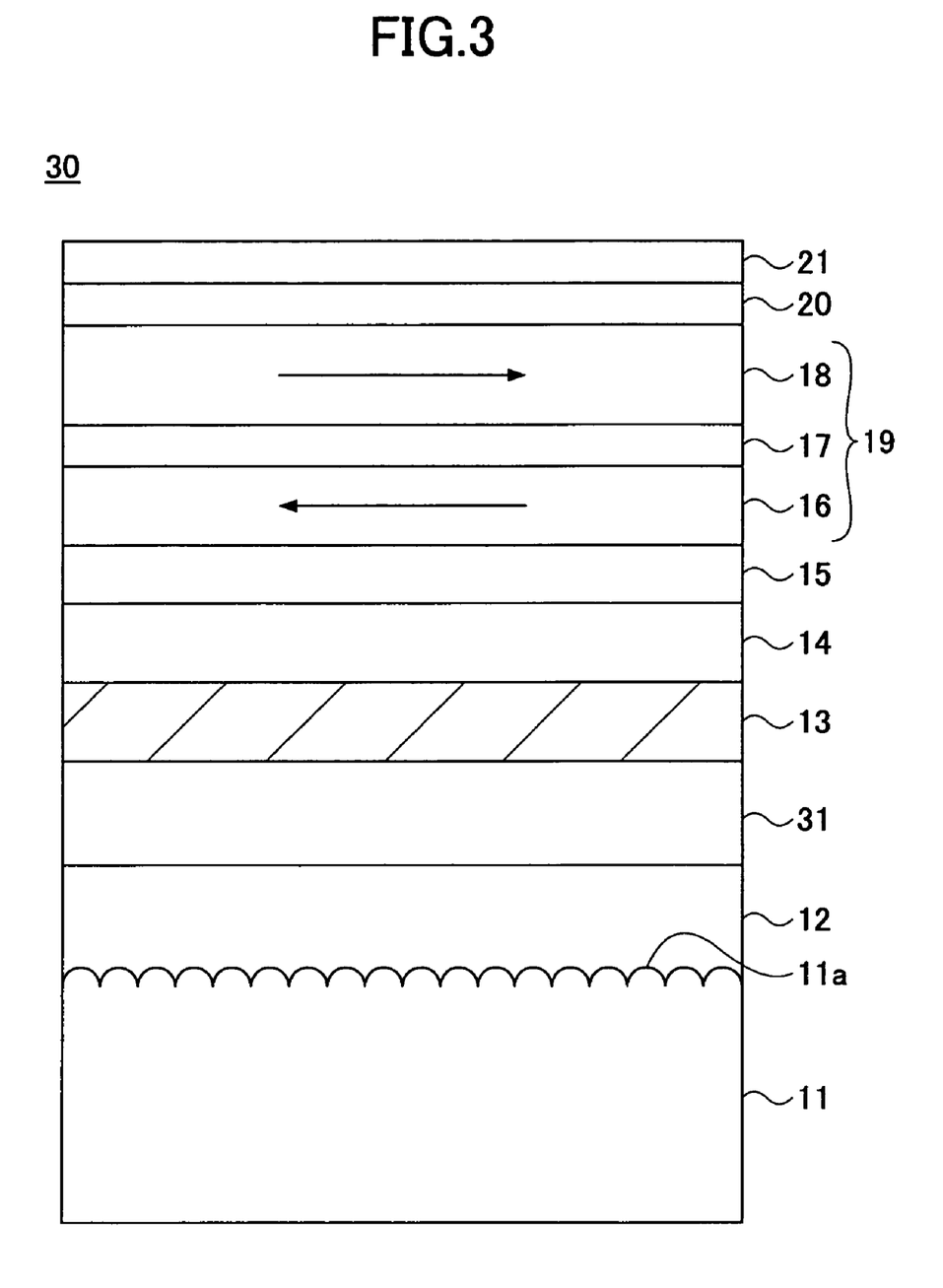
FIG. 3 is a cross sectional view showing a second embodiment of the magnetic recording medium according to the present invention.

FIG. 3 is a cross sectional view showing a second embodiment of the magnetic recording medium according to the present invention. In FIG. 3, those parts which are the same as those corresponding parts in FIG. 2 are designated by the same reference numerals, and a description thereof will be omitted.

A magnetic recording medium 30 shown in FIG. 3 has a substrate 11 with a textured surface 11a. A first seed layer 12, a second seed layer 31, an AlFe-based alloy layer 13, an underlayer 14, an nonmagnetic intermediate layer 15, a first magnetic layer 16, a nonmagnetic coupling layer 17, a second magnetic layer 18, a protection layer 20 and a lubricant layer 21 are successively stacked on the textured surface 11a of the substrate 11. The basic structure of the magnetic recording medium 30 is similar to that of the magnetic recording medium 10 shown in FIG. 2, except that the second seed layer 31 is additionally provided in the magnetic recording medium 30. The first seed layer 12 of the magnetic recording medium 30 is the same as the seed layer 12 of the magnetic recording medium 10.

The second seed layer 31 is made of an alloy having a B2 crystal structure, other than AlFe-based alloys, such as AlRu-based alloys and NiAl-based alloys. The second seed layer 31 has a thickness preferably in a range of 5 nm to 30 nm. By providing the second seed layer 31, the AlFe-based alloy layer 13 having the same B2 crystal structure more easily forms the crystal structure thereof, thereby making it possible to obtain similar effects obtainable by the first embodiment but in a more conspicuous manner.

Therefore, according to this second embodiment, the coercivity of the recording layer 19 in the circumferential direction is further increased, and the thermal stability is further improved.

Figure 4:
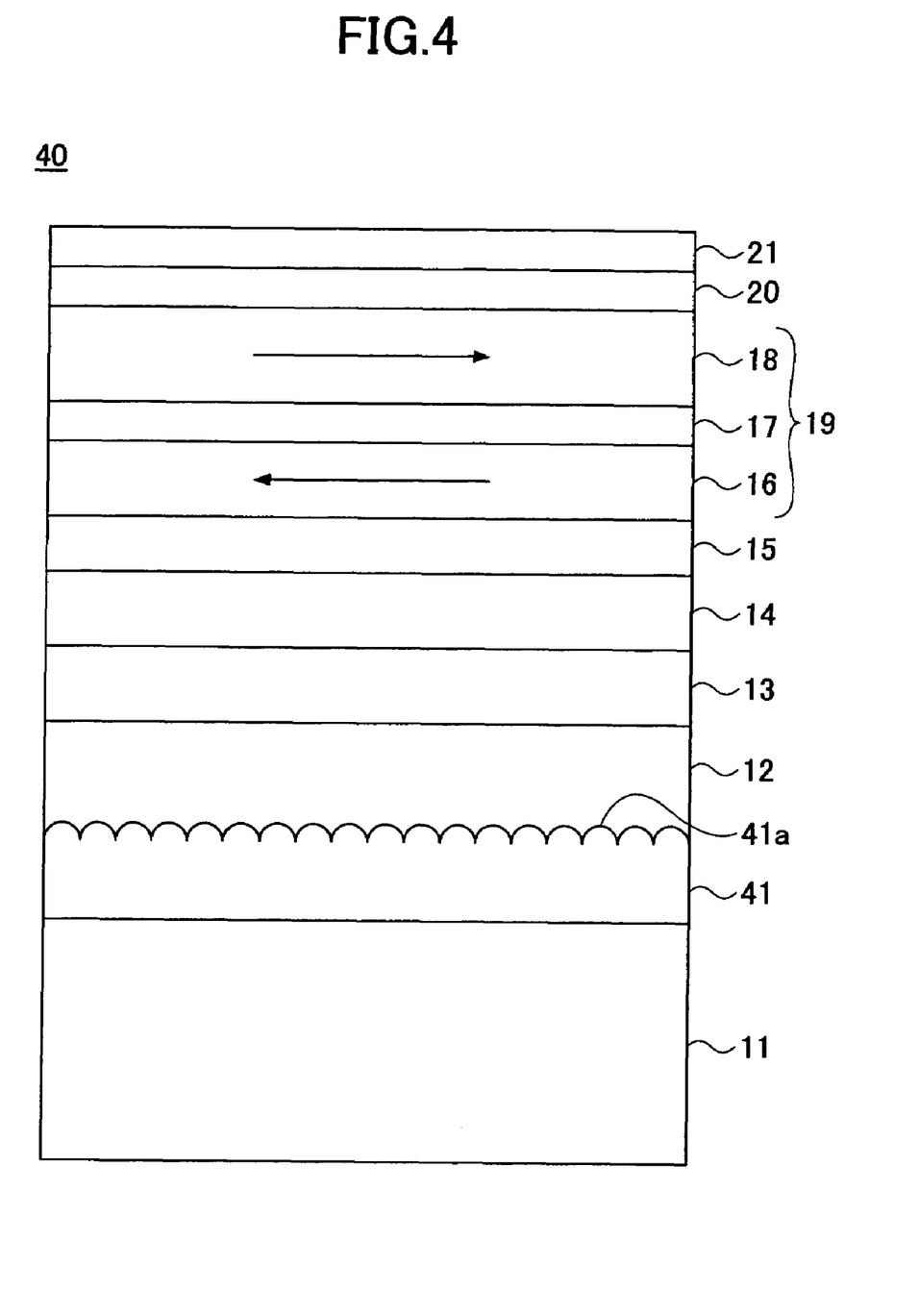
FIG. 4 is a cross sectional view showing a third embodiment of the magnetic recording medium according to the present invention.

FIG. 4 is a cross sectional view showing a third embodiment of the magnetic recording medium according to the present invention. In FIG. 4, those parts which are the same as those corresponding parts in FIG. 2 are designated by the same reference numerals, and a description thereof will be omitted.

A magnetic recording medium 40 shown in FIG. 4 has a substrate 11. A texture forming layer 41 having a textured surface 41a, a seed layer 12, an AlFe-based alloy layer 13, an underlayer 14, an nonmagnetic intermediate layer 15, a first magnetic layer 16, a nonmagnetic coupling layer 17, a second magnetic layer 18, a protection layer 20 and a lubricant layer 21 are successively stacked on the substrate 11. The basic structure of the magnetic recording medium 40 is similar to that of the magnetic recording medium 10 shown in FIG. 2, except that the texture forming layer 41 is additionally provided in the magnetic recording medium 40.

The texture forming layer 41 is made of a nonmagnetic material such as amorphous or microcrystalline NiP, CoW and CrTi. The textured surface 41a formed on the texture forming layer 41 is similar to the textured surface 11a of the substrate 11 of the first embodiment shown in FIG. 2. For example, a mechanical texturing made up of a large number of grooves may be formed along the circumferential direction on the surface of the texture forming layer 41 to form the textured surface 41a. In a case where the texture forming layer 41 is made of NiP, it is preferable that the surface of the texture forming layer 41 is oxidized.

According to the magnetic recording medium 40, the textured surface 41a is formed on the texture forming layer 41, and the AlFe-based alloy layer 13 is formed on the textured surface 41a via the seed layer 12. For this reason, it is possible to obtain effects similar to those obtainable in the first embodiment shown in FIG. 2. In addition, the texture forming layer 41 may be made of a material which facilitates the formation of the mechanical texturing or the like on the textured surface 41a, so that the substrate 11 may be made of a material selected from a wider range of materials. In this third embodiment, the seed layer 12 may be omitted, that is, the seed layer 12 may or may not be provided, because the texture forming layer 41 and the seed layer 12 of the magnetic recording medium 40 are made of the same type of materials.

Figure 5:
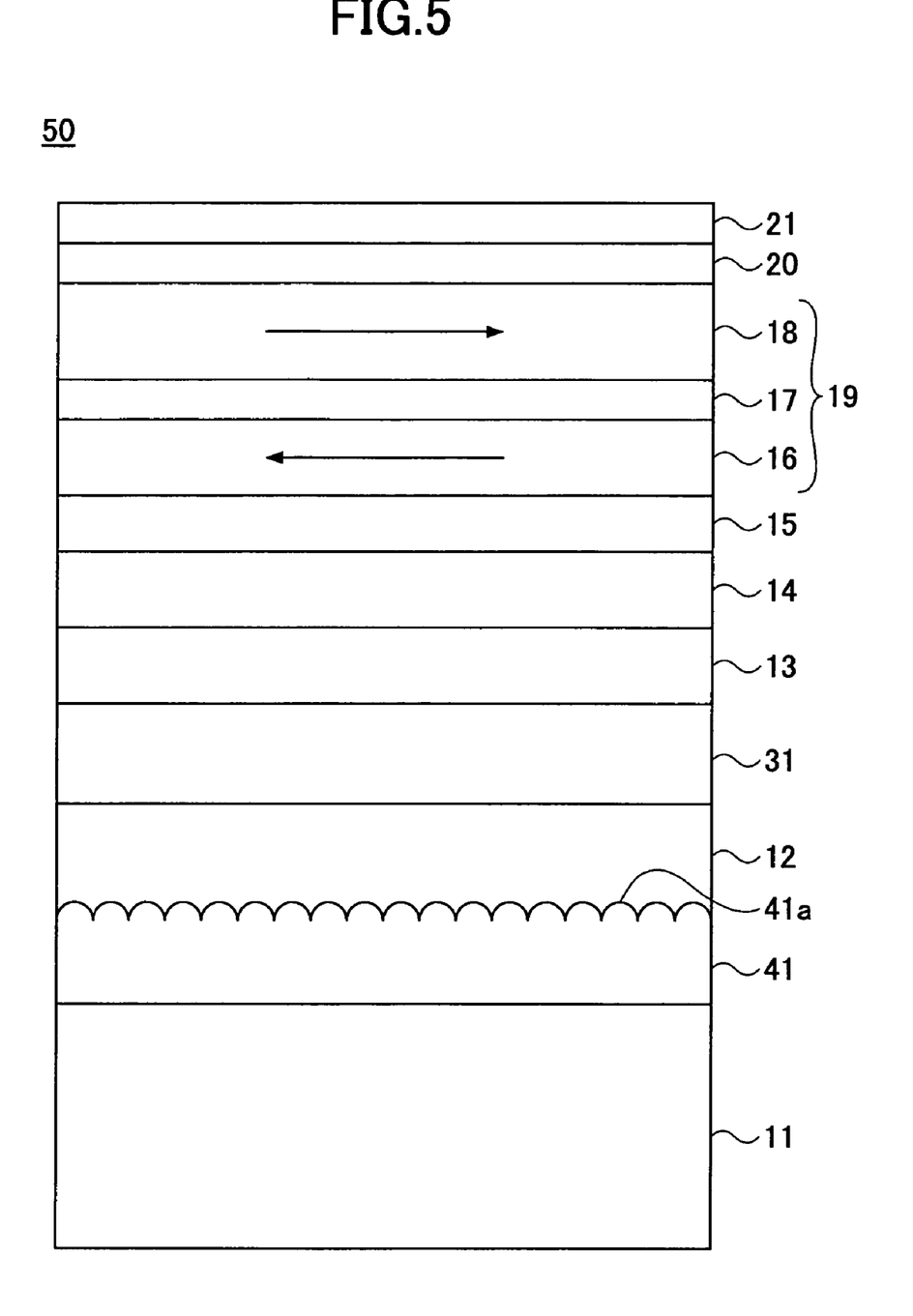
FIG. 5 is a cross sectional view showing a fourth embodiment of the magnetic recording medium according to the present invention.

FIG. 5 is a cross sectional view showing a fourth embodiment of the magnetic recording medium according to the present invention. In FIG. 5, those parts which are the same as those corresponding parts in FIGS. 3 and 4 are designated by the same reference numerals, and a description thereof will be omitted.

A magnetic recording medium 50 shown in FIG. 5 has a substrate 11. A texture forming layer 41 having a textured surface 41a, a first seed layer 12, a second seed layer 31, an AlFe-based alloy layer 13, an underlayer 14, an nonmagnetic intermediate layer 15, a first magnetic layer 16, a nonmagnetic coupling layer 17, a second magnetic layer 18, a protection layer 20 and a lubricant layer 21 are successively stacked on the substrate 11.

The basic structure of the magnetic recording medium 50 is a combination of those of the magnetic recording medium 30 shown in FIG. 3 and the magnetic recording medium 40 shown in FIG. 4. Accordingly, it is possible to obtain effects similar to those obtainable in the second and third embodiments.

Next, a description will be given of embodiment samples.

Embodiment Samples Emb1

Embodiment samples Emb1 were made in the following manner. First, a mechanical texturing was formed on the surface of a glass surface using a mechanical texturing apparatus. The mechanical texturing was formed by supplying a diamond slurry having an average grain diameter of 0.1 μm to a polyester pad, pushing the pad which holds the diamond slurry against the glass substrate surface, and rotating the glass substrate, so that the texturing having an average surface roughness of 0.4 nm measured by Atomic Force Microscope (AFM) is formed on the surface of the glass substrate.

The glass substrate having the textured surface was cleaned, and the following layers were successively formed by a DC magnetron sputtering apparatus, so as to create a magnetic disk.

Glass substrate 11: 65 mm diameter
Seed layer 12: 20 nm thick $Cr_{50}Ti_{50}$
AlFe-based alloy layer 13: 10 nm thick $Al_{100-x}Fe_x$
Underlayer 14: 5 nm thick $Cr_{75}Mo_{25}$
Nonmagnetic intermediate layer 15: 1 nm thick $Co_{58}Cr_{42}$
First magnetic layer 16: 1.8 nm thick $Co_{90}Cr_{10}$
Nonmagnetic coupling layer 17: 0.7 nm thick Ru
Second magnetic layer 18: CoCrPtBCu
Protection layer 20: 4.5 nm thick C The suffix of each element indicates the at. %. The thickness of the second magnetic layer 18 was set so that the residual magnetization and thickness product of the recording layer 19 becomes 3.5 nTm. For the $Al_{100-x}Fe_x$ layer 13, the value of x was changed at 10 at. % increments, so as to obtain an embodiment sample Emb1-1 when x=30, an embodiment sample Emb1-2 when x=40, an embodiment sample Emb1-3 when x=50, and an embodiment sample Emb1-4 when x=50.

The layers on the glass substrate 11 were formed under the following conditions. First, prior to forming the $Cr_{50}Ti_{50}$ seed layer 12, the glass substrate 11 was heated to 170° C. under vacuum using a Pyrolysis Boron Nitride (PBN) heater. Using the DC magnetron sputtering apparatus, each layer from the $Cr_{50}Ti_{50}$ seed layer 12 up to the $Co_{90}Cr_{10}$ first magnetic layer 16 were successively formed within an Ar gas atmosphere at a pressure of 0.67 Pa. Thereafter, the stacked structure was heated to 230° C. under vacuum using the PBN heater prior to forming the Ru nonmagnetic coupling layer 17. Then, using the DC magnetron sputtering apparatus, each layer from the Ru nonmagnetic coupling layer 17 up to the C protection layer 20 were successively formed within an Ar gas atmosphere at a pressure of 0.67 Pa. A vacuum container of the DC magnetron sputtering apparatus was exhausted in advance to a high vacuum (pressure) of $1\times10^{-5}$ Pa or less, before supplying therein the Ar gas.

Embodiment Samples Emb2

Embodiment samples Emb2 were made similarly to the embodiment samples Emb1 described above, but a 10 nm thick $Al_{50}Ru_{50}$ second seed layer 31 was formed between the $Cr_{50}Ti_{50}$ first seed layer 12 and the $Al_{100-x}Fe_x$ layer 13 of the magnetic disk. For the $Al_{100-x}Fe_x$ layer 13, the value of x was changed at 10 at. % increments, so as to obtain an embodiment sample Emb2-1 when x=30, an embodiment sample Emb2-2 when x=40, an embodiment sample Emb2-3 when x=50, and an embodiment sample Emb2-4 when x=50.

COMPARISON EXAMPLE

A comparison example Cmp was made similarly to the embodiment samples Emb1, except that the $Al_{100-x}Fe_x$ layer 13 was not provided in the magnetic disk.

Figure 6:
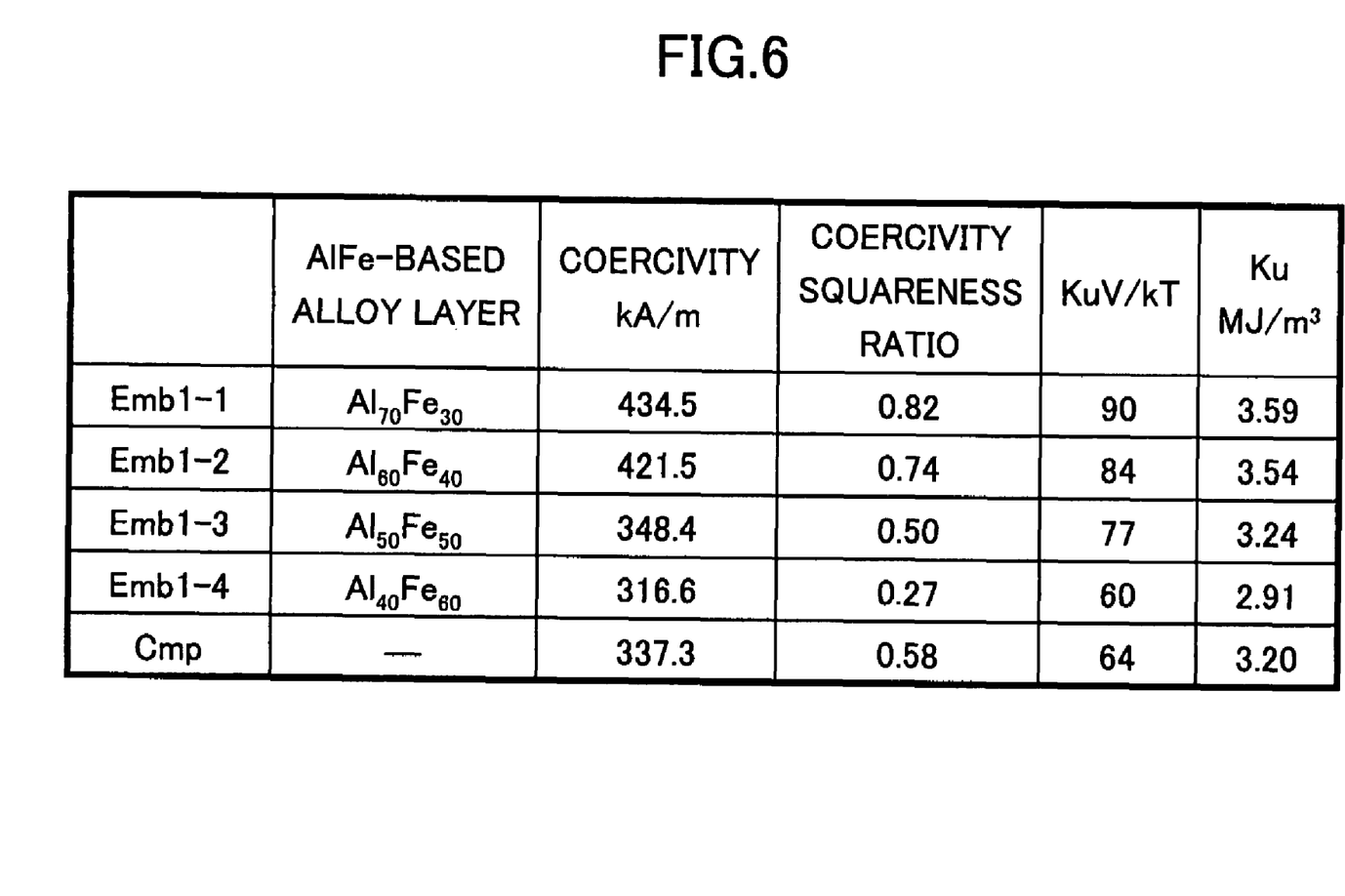
FIG. 6 is a diagram showing magnetic characteristics of embodiment samples and a comparison example.

FIG. 6 is a diagram showing the magnetic characteristics of the embodiment samples Emb1 and the comparison example Cmp. In FIG. 6, the coercivity shown is the coercivity of the recording layer in the circumferential direction of the magnetic disk, and the coercivity squareness ratio shown is the coercivity squareness ratio of the recording layer. In addition, KuV/kT is the index indicating the thermal stability, and the larger the KuV/kT value, the more difficult it is for the residual magnetization to decrease and making the reliability of the magnetic disk higher. Ku denotes an uniaxial anisotropy constant of the recording layer, V denotes a substantial average volume of the crystal grains of the recording layer carrying the residual magnetization, k denotes a Boltzmann's constant, and T denotes the absolute temperature of the magnetic disk. The larger the uniaxial anisotropy constant Ku, the larger the coercivity of the recording layer in the circumferential direction and the larger the KuV/kT value.

As may be seen from FIG. 6, compared to the comparison example Cmp which is not provided with the $Al_{100-x}Fe_x$ layer 13, the coercivity of the magnetic disk in the circumferential direction, the KuV/kT value and the uniaxial anisotropy constant Ku are considerably increased for the embodiment samples Emb1-1, Emb1-2 and Emb1-3. Of the embodiment samples Emb1-1, Emb1-2 and Emb1-3, the coercivity of the magnetic disk in the circumferential direction, the KuV/kT value and the uniaxial anisotropy constant Ku are greatly increased particularly for the embodiment sample Emb1-1 having the small Fe concentration in the $Al_{100-x}Fe_x$ layer 13.

In addition, compared to the comparison example Cmp which is not provided with the $Al_{100-x}Fe_x$ layer 13, the coercivity squareness ratio is increased for the embodiment samples Emb1-1 and Emb1-2. Compared to the embodiment sample Emb1-2 having the Fe concentration of 40 at. % in the $Al_{100-x}Fe_x$ layer 13, the coercivity squareness ratio is increased particularly for the embodiment sample Emb1-1 having the Fe concentration of 30 at. % in the $Al_{100-x}Fe_x$ layer 13.

Therefore, according to the embodiment samples Emb1-1 through Emb1-4 and the comparison example Cmp, it was confirmed that the coercivity of the magnetic disk in the circumferential direction, the KuV/kT value and the uniaxial anisotropy constant Ku are considerably increased when the Fe concentration in the $Al_{100-x}Fe_x$ layer 13 is in a range of 30 at. % to 50 at. %. In addition, it was confirmed that the magnetic characteristics of the magnetic disk, including the coercivity squareness ratio, are greatly improved when the Fe concentration in the $Al_{100-x}Fe_x$ layer 13 is in the range of 30 at. % to 50 at. %. It was also confirmed that the magnetic characteristics of the magnetic disk improves for lower Fe concentrations in the $Al_{100-x}Fe_x$ layer 13.

Figure 7:
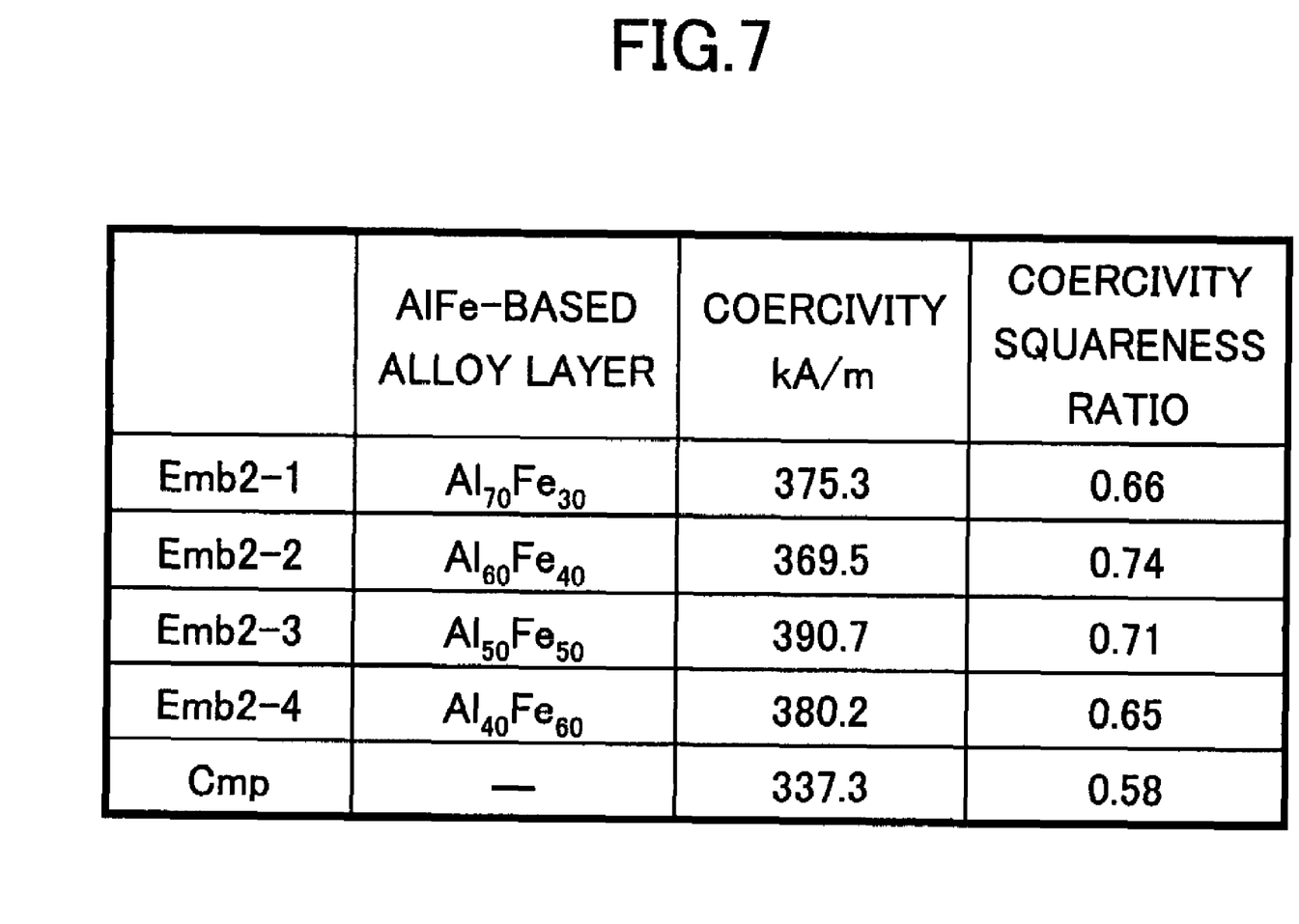
FIG. 7 is a diagram showing magnetic characteristics of embodiment samples and a comparison example.

FIG. 7 is a diagram showing the magnetic characteristics of the embodiment samples Emb2 and the comparison example Cmp. The comparison sample Cmp is the same as the comparison sample Cmp shown in FIG. 6. In FIG. 7, the coercivity shown is the coercivity of the recording layer in the circumferential direction of the magnetic disk, and the coercivity squareness ratio shown is the coercivity squareness ratio of the recording layer.

As may be seen from FIG. 7, compared to the comparison example Cmp which is not provided with the $Al_{100-x}Fe_x$ layer 13, the coercivity of the magnetic disk in the circumferential direction and the coercivity squareness ratio are considerably increased for the embodiment samples Emb2-1, Emb2-2, Emb2-3 and Emb2-4.

Therefore, according to the embodiment samples Emb2-1 through Emb2-4 and the comparison example Cmp, it was confirmed that the coercivity of the magnetic disk in the circumferential direction and the coercivity squareness ratio are considerably improved when the Fe concentration in the $Al_{100-x}Fe_x$ layer 13 is in a range of 30 at. % to 60 at. %.

The coercivity of the recording layer in the circumferential direction and the coercivity squareness ratio were measured by a Vibration Sample Magnetometer VSM by applying a magnetic field (maximum applied field of 790 kA/m) in the circumferential direction of the magnetic disk. In addition, the KuV/kT values for the magnetic disks of the embodiment samples Emb1-1 through Emb1-4 and the comparison sample were obtained from a relationship between a dynamic coercivity and an anisotropic field described in Bertram et al., J. Appl. Phys., vol. 85, No. 8, pp. 49-91, 1991, by obtaining a time dependency of the dynamic coercivity using a spin stand and a magnetic head. In addition, the anisotropy constant Ku was obtained from the average volume V of the crystal grains of the recording layer 19 and the KuV/kT value, by obtaining the average volume V from a sum of the thicknesses of the $Co_{90}Cr_{10}$ first magnetic layer 16 and the CoCrPtBCu second magnetic layer 18 and the average grain diameter of the crystal grains forming the CoCrPtBCu second magnetic layer 18 obtained from a Transmission Electron Microscope (TEM) photograph of the CoCrPtBCu second magnetic layer 18. The Boltzmann's constant was used for the k value, and the temperature at the time of measuring the dynamic coercivity was used for the T value.

Figure 8:
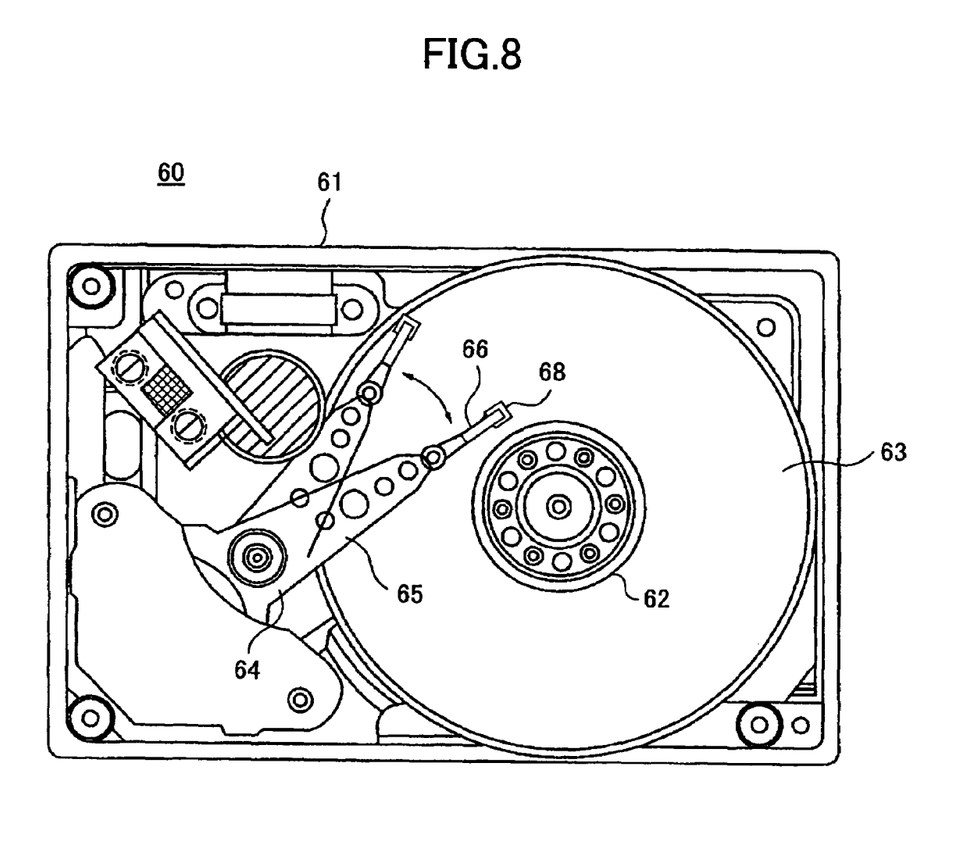
FIG. 8 is a plan view showing an important part of an embodiment of a magnetic storage apparatus according to the present invention.

Next, a description will be given of an embodiment of a magnetic storage apparatus according to the present invention, by referring to FIG. 8. FIG. 8 is a plan view showing an important part of this embodiment of the magnetic storage apparatus according to the present invention.

A magnetic storage apparatus 60 shown in FIG. 8 is generally made up of a housing 61. A hub 62 that is driven by a spindle motor (not shown), one or a plurality of magnetic recording media 63 fixed on the hub 62, an actuator unit 64, an arm 65 mounted on the actuator unit 64 and movable in a radial direction of the magnetic recording medium 63, a suspension 66 provided on the arm 65, and a magnetic head 68 supported on the suspension 66 are provided within the housing 61. The number of arms 65, suspensions 66 and magnetic heads 68 that are provided depends on the number of magnetic recording media 63 that are provided.

The magnetic head 68 may be formed by a composite head that is made up of a reproducing head and a recording head. For example, the reproducing head may be formed by a magneto-resistive (MR) element, a giant magneto-resistive (GMR) element or a tunneling magnetic-resistive (TMR). The recording head may be formed by an inductive head, for example. The basic structure itself of the magnetic storage apparatus 60 shown in FIG. 8 is known, and a detailed description thereof will be omitted in this specification.

In the magnetic storage apparatus 60, the magnetic recording medium 63 may have the structure of any one of the embodiments of the magnetic recording medium described above. In other words, the magnetic recording medium 10, 30, 40 or 50 may be used as the magnetic recording medium 63. Since the magnetic recording medium 63 has a recording layer having a high coercivity in the circumferential direction and a superior thermal stability, it is possible to realize the magnetic storage apparatus 60 having a high recording density. In addition, because of the high coercivity of the recording layer in the circumferential direction, the thermal stability can be maintained even if the surface roughness of the textured surface (which surface roughness is proportional to the coercivity) and thus the surface roughness of the magnetic recording medium 63 are reduced, so that the floating distance of the magnetic head 68 from the surface of the magnetic recording medium 63 may be reduced, to further increase the high recording density of the magnetic storage apparatus 60.

Needless to say, the basic structure of the magnetic storage apparatus 60 is not limited to that shown in FIG. 8, and the magnetic head 68 is also not limited to that described above.

Of course, the present invention is not limited to magnetic disks, and the magnetic recording medium and the magnetic storage apparatus according to the present invention can of course be applied to other magnetic recording media such as magnetic tapes. In the case of the magnetic tape, a tape-shaped substrate may be used. The tape-shaped substrate may be formed by a tape-shaped plastic film made of PET, PEN, polyimide or the like.

Further, the present invention is not limited to these embodiments, but various variations and modifications may be made without departing from the scope of the present invention.

What is claimed is:

1. A magnetic recording medium comprising:
a substrate;
an AlFe-based alloy layer provided above the substrate;
an underlayer provided on the AlFe-based alloy layer; and
a recording layer, provided on the underlayer, and magnetized in a predetermined recording direction when being recorded with information, wherein the substrate has a textured surface having grooves formed approximately along the recording direction, and wherein the AlFe-based alloy layer is made of AlFe having a Fe atomic concentration in a range of 30 at. % to 40 at. %, wherein sublattices SL-1 and SL-2 of the AlFe are distorted.

2. The magnetic recording medium as claimed in claim 1, further comprising:

a seed layer, made of an amorphous material, provided between the substrate and the AlFe-based alloy layer.

3. The magnetic recording medium as claimed in claim 1, further comprising:

a seed layer, made of a material that is other than AlFe-based alloys and has a B2 crystal structure, provided immediately under the AlFe-based alloy layer.

4. The magnetic recording medium as claimed in claim 3, wherein the seed layer is made of an AlRu alloy or a NiAl alloy.

5. The magnetic recording medium as claimed in claim 1, wherein the substrate has a disk shape, and the textured surface is textured in a circumferential direction of the disk shape.

6. The magnetic recording medium as claimed in claim 1, wherein the AlFe-based alloy layer has a thickness in a range of 2 nm to 100 nm.

7. The magnetic recording medium as claimed in claim 1, further comprising:

a nonmagnetic intermediate layer, provided between the underlayer and the recording layer, and made of a Co—X3 alloy, where X3=Cr, Ta Mo, Mn, Re, Ru or an alloy thereof.

8. The magnetic recording medium as claimed in claim 1, wherein the recording layer comprises:

a first magnetic layer provided on the underlayer;

a nonmagnetic coupling layer provided on the first magnetic layer; and a second magnetic layer provided on the nonmagnetic coupling layer, wherein the first and second magnetic layers are antiferromagnetically exchange-coupled via the nonmagnetic coupling layer such that magnetizations of the first and second magnetic layers are mutually antiparallel in a state where no external magnetic field is applied on the magnetic recording medium.

9. The magnetic recording medium as claimed in claim 8, wherein the first magnetic layer and/or the second magnetic layer is made of a CoCr-M1 alloy, where M1=Pt, B, Ta, Ni, Cu, Ag, Pd, Si, C, Fe, Re, Nb, Hf or an alloy thereof.

10. A magnetic recording medium comprising:

a substrate;

a texturing layer provided on the substrate;

an AlFe-based alloy layer provided above the texturing layer;

an underlayer provided on the AlFe-based alloy layer; and a recording layer, provided on the underlayer, and magnetized in a predetermined recording direction when being recorded with information, wherein the texturing layer has a textured surface having grooves formed approximately along the recording direction, and wherein the AlFe-based alloy layer is made of AlFe having a Fe atomic concentration in a range of 30 at. % to 40 at. %, wherein sublattices SL-1 and SL-2 of the AlFe are distorted.

11. The magnetic recording medium as claimed in claim 10, further comprising:

a seed layer, made of an amorphous material, and provided between the texturing layer and the AlFe-based alloy layer.

12. The magnetic recording medium as claimed in claim 11, wherein the seed layer is made of a material selected from a group consisting of CoW, CrTi and NiP.

13. The magnetic recording medium as claimed in claim 10, further comprising:

a seed layer, made of a material that is other than AlFe-based alloys and has a B2 crystal structure, provided immediately under the AlFe-based alloy layer.

14. The magnetic recording medium as claimed in claim 13, wherein the seed layer is made of an AlRu alloy or a NiAl alloy.

15. The magnetic recording medium as claimed in claim 10, wherein the substrate has a disk shape, and the textured surface is textured in a circumferential direction of the disk shape.

16. The magnetic recording medium as claimed in claim 10, wherein the AlFe-based alloy layer has a thickness in a range of 2 nm to 100 nm.

17. The magnetic recording medium as claimed in claim 10, further comprising:

a nonmagnetic intermediate layer, provided between the underlayer and the recording layer, and made of a Co—X3 alloy, where X3=Cr, Ta Mo, Mn, Re, Ru or an alloy thereof.

18. The magnetic recording medium as claimed in claim 10, wherein the recording layer comprises:

a first magnetic layer provided on the underlayer;

a nonmagnetic coupling layer provided on the first magnetic layer; and a second magnetic layer provided on the nonmagnetic coupling layer, wherein the first and second magnetic layers are antiferromagnetically exchange-coupled via the nonmagnetic coupling layer such that magnetizations of the first and second magnetic layers are mutually antiparallel in a state where no external magnetic field is applied on the magnetic recording medium.

19. The magnetic recording medium as claimed in claim 18, wherein the first magnetic layer and/or the second magnetic layer is made of a CoCr-M1 alloy, where M1=Pt, B, Ta, Ni, Cu, Ag, Pd, Si, C, Fe, Re, Nb, Hf or an alloy thereof.

20. A magnetic storage apparatus comprising:

at least one magnetic recording medium; and a head configured to record information on and reproduce information from the magnetic recording medium, wherein the magnetic recording medium comprises a substrate, an AlFe-based alloy layer provided above the substrate, an underlayer provided on the AlFe-based alloy layer, and a recording layer provided on the underlayer and magnetized in a predetermined recording direction when being recorded with information, and the substrate has a textured surface having grooves formed approximately along the recording direction, and wherein the AlFe-based alloy layer is made of AlFe having a Fe atomic concentration in a range of 30 at. % to 40 at. %, wherein sublattices SL-1 and SL-2 of the AlFe are distorted.

21. A magnetic storage apparatus comprising:
at least one magnetic recording medium; and
a head configured to record information on and reproduce information from the magnetic recording medium,
wherein the magnetic recording medium comprises a substrate, a texturing layer provided on the substrate, an AlFe-based alloy layer provided above the texturing layer, an underlayer provided on the AlFe-based alloy layer, and a recording layer provided on the underlayer and magnetized in a predetermined recording direction when being recorded with information, and the texturing layer has a textured surface having grooves formed approximately along the recording direction, and wherein the AlFe-based alloy layer is made of AlFe having a Fe atomic concentration in a range of 30 at. % to 40 at. %, wherein sublattices SL-1 and SL-2 of the AlFe are distorted.

\* \* \* \* \*